United States Patent Office 3,840,683
Patented Oct. 8, 1974

3,840,683
EGG PRODUCT
David R. Strong, Norwalk, Conn., and Sutton Redfern, White Plains, N.Y., assignors to Standard Brands Incorporated, New York, N.Y.
No Drawing. Filed Aug. 2, 1972, Ser. No. 277,423
Int. Cl. A131 1/32
U.S. Cl. 426—177        11 Claims

ABSTRACT OF THE DISCLOSURE

A substantially cholesterol free egg product comprising egg white, nonfat milk solids, vegetable oil and a coloring agent comprising a mixture of beta-carotene and an extract of plant xanthophylls in such proportions and amounts as to impart substantially the characteristic color of whole eggs to said egg product.

THE INVENTION

This invention relates to a substantially cholesterol free egg product. More particularly, this invention relates to a substantially cholesterol free egg product comprising egg white, nonfat milk solids, vegetable oil and a coloring agent comprising a mixture of beta-carotene and an extract of plant xanthophylls in such proportions and amounts as to impart substantially the characteristic color of whole eggs to said product.

Eggs have long been considered to be among the most nutritionally valuable of foods for human consumption. Egg protein is of exceptional nutritional quality and is, in fact, used as a standard against which the nutritional efficiency of other food proteins is evaluated. Egg protein is found in both the white portion of the egg and in the yolk. Fat and cholesterol, on the other hand, are concentrated in the yolk. According to *Composition of Foods, Agricultural Handbook No. 8,* U.S. Department of Agriculture (1963), 100 grams of whole egg, edible portion (approximately 2 large eggs), provides about 4 grams of saturated fat and 550 mg. of cholesterol.

It is now generally believed that high blood cholesterol levels in humans are implicated in the onset and/or severity of cardiovascular disease. The amount of saturated fat ingested is also, in some manner, believed to be a factor in promoting the development of elevated blood cholesterol levels. Polyunsaturated fat, i.e., linoleic acid, on the other hand, is considered to be effective in lowering cholesterol levels. With the emphasis now being placed on the importance of reducing the dietary intake of cholesterol and saturated fat, many medical and nutrition authorities recommend that the intake of a number of highly popular foods, including eggs, be restricted or that their use be eliminated entirely, in some instances. There is evidence that egg yolk cholesterol may be particularly effective in increasing the levels of cholesterol in the blood. As a result, many people have been required to drastically reduce the number of eggs in their diets and are thus deprived of food which have traditionally been considered among the most enjoyable and nutritious of foods.

Most of the eggs produced in this country are consumed at home, where they are eaten directly or used in cooking and baking, or they are used in commercial production of baked goods. Whether used at home or in the bakery, eggs are expected to meet high standards of quality and performance. A large number of specialized egg products are available to the baking industry which meet the requirements for convenience and performance. Here too, however, it is likely that concern over the cholesterol and saturated fat contents of products containing whole eggs may be having a deleterious effect on consumer acceptance of the same. Presently available modified egg products have not been well accepted by the public. Generally, these products have failed to meet the organoleptic expectations of consumers or have not performed adequately in cooking and baking functions.

There are a number of patents which are directed to providing egg products having organoleptic characteristics similar to whole eggs but having reduced calorie content and/or cholesterol levels. Exemplary of such patents are U.S. Pat. 3,207,609 to Gorman et al., U.S. Pat. 3,475,180 to Jones and U.S. Pat. 3,563,765 to Melnick.

In order for a low cholesterol liquid egg product to be acceptable to the consumer, it must be substantially similar to whole eggs in respect to functional and organoleptic properties such as color. Color is extremely important since it is the first impression imparted to the consumer and, if such is not satisfactory, the possibility of acceptance of the egg product will be greatly diminished even though the other organoleptic and functional properties are satisfactory. Not only must the color of a low cholesterol liquid egg product be similar to whole eggs, but also when the product is cooked, the color must be similar to that of cooked whole eggs and when the product is used for preparing cakes and the like it must impart to these products substantially the color normally imparted by whole eggs.

Therefore, it is the principal object of the present invention to provide a substantially cholesterol free egg product which has the characteristic color of whole eggs.

This object and other objects of the present invention which will be apparent from the following description are attained in accordance with the present invention by providing a substantially cholesterol-free egg product comprising egg white, nonfat milk solids, vegetable oil and a coloring agent comprising a mixture of beta-carotene and an extract of plant xanthophylls in suitable proportions and amounts to impart substantially the characteristic color of whole eggs to said egg product.

The term "characteristic color of whole egg" as used in this description and the appended claims is used to define the range of colors naturally present in whole eggs. The color of whole eggs may vary somewhat as does the preference of the consumer for the same. Factors affecting the color of whole eggs include the diet of the hen and the breed thereof. Generally, in the eastern part of the United States, the preferred color is a pale yellow having a slight orange hue, whereas in the western part of the United States a color which is predominantly orange with a yellow hue is generally preferred. These colors and preferences therefor also carry over to cooked egg products, for example, scrambled eggs prepared from whole eggs. An orange-yellow color or a yellow-orange color and various shades and hues thereof is considered for the purpose of the present invention to the color most representative of whole eggs and the color most likely to meet the preferences of most consumers.

The term "egg product" as used in this description and the appended claims includes a liquid egg product and a cooked egg product, for example scrambled eggs, unless otherwise specified.

The combination of beta-carotene and an extract of plant xanthophylls in suitable proportions and amounts imparts to the liquid egg product the characteristic color of whole eggs and this characteristic color carries over to cooked eggs, such as scrambled eggs, prepared from the egg product and also to cakes and the like in which the product is used. The proportions of beta-carotene and an extract of plant xanthophylls and the amounts thereof which impart the characteristic color of whole eggs may vary over a relatively wide range. The amount of beta-carotene may be in the range of from about 0.000015 to about 0.0057 percent and the amount of an extract of plant xanthophylls may be in the range of from about 0.00005 to about 0.0044 percent. The preferred amounts of beta-carotene and an extract of plant xanthophylls are from about 0.0003 to about 0.003 percent and from about 0.00020 to about 0.0020 percent, respectively. The most preferred amounts of beta-carotene and an extract of plant xanthophylls are from about 0.0004 to about 0.0020 percent and from about 0.00026 to about 0.0010 percent, respectively.

The color imparted to the egg product when beta-carotene is present as the sole colorant varies depending upon the amount used. At low levels it imparts to the liquid egg product a pale orange color and as the levels are increased the orange color becomes more pronounced. In the cooked egg product, at low levels of beta-carotene a pale orange color having a pink hue is observed and as the levels are increased a deep red-orange color becomes pronounced. When an extract of plant xanthophylls is used as the sole colorant in liquid eggs at low levels a pale green yellow color is observed and as the levels are increased a deep gold color becomes more pronounced. In the cooked egg product, at low levels of an extract of plant xanthophylls a pale green yellow color is observed while at higher levels a deep gold color is pronounced.

Beta-carotene and an extract of plant xanthophylls are generally available commercially in a somewhat diluted form. For purposes of the present invention, the percentages of beta-carotene and an extract of plant xanthophylls enumerated above are expressed on an absolute basis and, therefore, when diluted forms of these materials are used, the dilution factor must be taken into consideration. The preferred extract of plant xanthophylls used in the egg product of the present invention is derived from the flower petals of plants of the genus *Tagetes*. One commercial source of this material is sold under the trade name of PIGMENTENE Yellow-Gold by Special Nutrients, Inc., Surfside, Florida.

The liquid egg white is responsible to a significant degree for providing desirable organoleptic and functional characteristics in the egg product. It is preferred that the principal protein source in the egg composition consist essentially of egg white. Other protein sources such as soya protein, whey and casein derivatives when present in the egg product seems to impart, in certain instances, an undesirable flavor and deleteriously affect the functional characteristics of the product. If very small amounts of these materials are present, of course, their effect may not be sufficiently discernible to be detrimental.

The amount of egg white present may be from about 24 to about 99.5 percent by weight. Preferably, however, the amount of egg white present is from about 40 to about 95 percent and most preferably the egg white present is from about 70 to about 90 percent.

The nonfat dry milk solids supply additional protein to the egg product and also seem to impart certain desirable functional characteristics. For example, when the liquid egg product is cooked, i.e., scrambled, the nonfat dry milk affects the texture of the product to an extent that it is more like a scrambled egg prepared from whole eggs. It also serves to control, to a certain extent, the separation of water from the cooked product, commonly referred to as syneresis, when it is cooked.

The amount of nonfat dry milk which is present in the product may vary over a relatively wide range, for instance from about 0.10 to about 15 percent. Preferably, however, the amount of nonfat dry milk which is present is from about 0.10 to about 10 percent and most preferably from about 3 to about 8 percent.

It is desirable to have lecithin present in the egg product. The function of the lecithin is principally to prevent the product from sticking to the vessel in which it is cooked. Only relatively small amounts of lecithin are necessary to achieve this objective, for instance from about 0.05 to about 1.2 percent. Preferably the amount of lecithin present is from about 0.1 to about 0.9 percent and most preferably the amount of lecithin present is from about 0.25 to about 0.35 percent.

Since beta-carotene and an extract of plant xanthophylls are oil soluble and water insoluble it is necessary to dissolve them in a small amount of vegetable oil so that they can be dispersed substantially evenly throughout the liquid egg product. Generally, only small amounts of oil are necessary to form the solution, for example, about 0.1 percent. When other materials, which are oil soluble and water insoluble, for example lecithin and emulsifiers are used in the preparation of the liquid egg product, slightly greater amounts of oil may be necessary, for example from about 1 to about 2 percent. These small amounts of oil do not seem to affect the organoleptic properties of the egg product. It is preferred that the egg product contain from about 9 to about 13 percent oil. The principal function of these amounts of oil is to provide a level of oil which is similar to the level of fat naturally present in whole eggs. However, these amounts of oil also seem to impart certain subtle organoleptic characteristics to the egg product. For instance, when the liquid egg product is scrambled, the oil appears to impart mouth feel and texture similar to scrambled whole eggs. Larger amounts of oil may be present, for instance up to about 40 percent. However, at high oil levels when the liquid egg product is scrambled, the scrambled product becomes increasingly soft and mushy.

The oil or fat naturally present in egg yolk contains a relatively large amount of cholesterol and has a relatively high saturated fat content. Vegetable oils, on the other hand, do not contain cholesterol and have a relatively low saturated fat content. Exemplary of vegetable oils which may be used in the present product are corn, cottonseed, soybean, safflower, sunflower, peanut, rape seed, olive, sesame oils and mixtures thereof. The preferred vegetable oil is corn oil.

Generally, egg white commercially available contains traces of egg yolk, for instance less than about 0.1 percent. This is due to methods by which the white is separated from the yolk.

A variety of methods may be used to form the liquid egg product of the present invention. However, for ease of manufacturing and other reasons it is preferred that a portion of the oil, i.e., about 15 percent of the total amount of oil used, be first added to the liquid egg white. The oil prevents foaming of the egg white when the other ingredients are subsequently incorporated through vigorous agitation into the product. Then the nonfat dry milk solids are added with thorough mixing to rehydrate the same. If all the oil were present prior to the nonfat dry milk being added, rehydration of the milk solids would be somewhat difficult to accomplish. Flavoring agents, bodying agents such as gums and the like, vitamins and minerals may be incorporated next into the mixture, if desired. Since only small amounts of these agents would be generally required, care must be taken to make certain that they are essentially evenly dispersed throughout the product. In this respect, a convenient mode of incorporating these materials is to dilute them somewhat with a portion of the nonfat dry milk solids to form a "pony" and mix this pony with the product. The remaining portion of the oil may be added prior or subsequent to the addition of the above referred to "pony."

A small amount of the total oil is used to act as a carrier for the lecithin and beta-carotene and an extract of plant xanthophylls. To form a dispersion of these ingredients in the oil, it is advantageous to heat the oil and incorporate these ingredients into the hot oil. Temperatures in the range of from about 130° to the about 150° F. have provided satisfactory results. This hot mixture may be incorporated with mixing directly into the liquid product.

It is preferred that the liquid egg product of the present invention be pasteurized. Although egg products are processed under stringent sanitary conditions, there is the possibility that they may be infected with undesirable microorganisms. In egg processing, *Salmonella* bacteria are of greatest concern. These microorganisms and others may be eliminated by a pasteurization treatment. However, due to the heat sensitivity of the egg products of the present invention, the pasteurization treatment must be such that it does not cause coagulation and/or denaturization of the egg white protein. Additionally, it must not cause discoloration, development of off-flavors, etc. A generally suitable pasteurization treatment is described in U.S. Pat. 3,251,697 to Lineweaver. The preferred salt of a polyvalent metal is aluminum sulfate.

In order to more clearly describe the nature of the present invention, specific examples will be hereinafter described. It should be understood, however, that this is done solely by way of example and is intended neither to delineate the scope of the invention nor limit the ambit of the appended claims. In the examples and throughout this specification, percentages are utilized to refer to percent by weight and are based on the weight of the substantially cholesterol free egg product of the present invention.

EXAMPLE I

This Example illustrates the effect of using varying proportions and amounts of beta-carotene and an extract of plant xanthophylls on the color of a substantially cholesterol free liquid egg product and on the color of the cooked egg product prepared therefrom.

A substantially cholesterol free liquid egg product was prepared containing the following percentages of ingredients:

81.6% pasteurized liquid egg white
0.12% trisodium citrate
0.008% triethyl citrate
0.0075% aluminum sulfate
11.8% corn oil
5.7% nonfat dry milk solids
0.29% lecithin
0.25% Myvatex 3-50 (a blend of mono- and diglycerides and propylene glycol monostearate manufactured by D.P.I. Div., Eastman Chemical Products Co.)
0.16% CMC 7MF (a carboxymethyl cellulose sold by Hercules, Inc.)
0.05% Keltrol F (a bacterial gum manufactured by Kelco Co.)
0.0064% comprising flavoring, minerals and water- and fat-soluble vitamins.

The above liquid egg product was prepared by first combining the non-fat dry milk solids, CMC 7MF, Keltrol F, aluminum sulfate, minerals and water soluble vitamins and then incorporating this mixture into pasteurized liquid egg white containing the trisodium citrate and the trethyl citrate. The corn oil, Myvatex 3-50, lecithin, flavoring and fat soluble vitamins were combined and heated to 140° F. and added to the egg white. The resulting product was homogenized and pasteurized. Two other egg products were prepared in this manner containing the amounts of ingredients shown above. Into one of the products there was added 0.00675 percent of a 30 percent dispersion of beta-carotene with the corn oil mixture and into another of the products there was added 0.0435 percent PIGMENTENE Yellow-Gold with the corn oil mixture. These two products containing the colorants were observed for color and then samples of the three prducts were combined to achieve various levels of beta-carotene and PIGMENTENE Yellow-Gold. These liquid egg products were observed for color and then scrambled eggs were prepared therefrom and the scrambled eggs were also observed for color. The results of these observations are shown in Table I.

TABLE I.—COLOR EFFECT OF BETA-CAROTENE AND AN EXTRACT OF PLANT XANTHOPHYLLS ON EGG PRODUCTS

| Percent of 30 percent dispersion of beta-carotene | Percent Pigmentene, yellow gold | Color observations | |
|---|---|---|---|
| | | Liquid egg product | Cooked egg product (scrambled) |
| 0.001250 | 0 | Pale orange | Pale orange—pink hue. |
| 0.002500 | 0 | | |
| 0.003750 | 0 | | |
| 0.00500 | 0 | to | to |
| 0.00750 | 0 | | |
| 0.01500 | 0 | | |
| 0.02500 | 0 | Deep orange | Very deep red-orange. |
| 0.000833 | 0.00081 | Weak orange—yellow hue | Weak orange-yellow hue. |
| 0.000627 | 0.00121 | Weak yellow-orange | Weak yellow-orange. |
| 0.000417 | 0.00162 | Weak yellow-orange hue | Do. |
| 0.001667 | 0.00161 | Pale orange-yellow hue | Pale orange-yellow hue. |
| 0.000833 | 0.00322 | Pale yellow-orange hue | Pale yellow-orange hue. |
| 0.001250 | 0.00242 | Bright yellow-orange | Bright yellow-orange. |
| 0.002500 | 0.00242 | Orange-yellow hue | Orange-yellow hue. |
| 0.001250 | 0.00484 | Golden orange-yellow | Golden orange-yellow. |
| 0.001870 | 0.00363 | Yellow-orange | Yellow-orange. |
| 0.00250 | 0.00484 | do | Do. |
| 0.00375 | 0.00726 | Deep yellow-orange | Veep yellow-orange. |
| 0.001667 | 0.00659 | Golden orange-yellow | Golden orange-yellow. |
| 0.00333 | 0.00345 | Orange-yellow hue | Orange-yellow hue. |
| 0.002500 | 0.00968 | Deep golden orange-yellow hue | Deep golden orange-yellow hue. |
| 0.00500 | 0.00484 | Deep orange-yellow hue | Deep orange-yellow hue. |
| 0.00750 | 0.0145 | Deep yellow-orange | Deep yellow-orange. |
| 0.00500 | 0.01932 | Deep golden orange-yellow | Deep golden orange-yellow. |
| 0.01000 | 0.00966 | Deep orange-yellow hue | Deep orange-yellow hue. |
| 0.01127 | 0.0460 | Very deep yellow-orange | Very deep yellow-orange. |
| 0.00750 | 0.0290 | Very deep golden orange w/yellow hue | Very deep golden orange w/yellow hue. |
| 0.01500 | 0.0145 | Very deep orange w/yellow hue | Very deep orange w/yellow hue. |
| 0 | 0.00242 | Pale green yellow | Pale green yellow. |
| 0 | 0.00484 | | |
| 0 | 0.00726 | | |
| 0 | 0.00968 | to | to |
| 0 | 0.0145 | | |
| 0 | 0.0290 | | |
| 0 | 0.0435 | Deep gold | Deep gold. |

EXAMPLE II

This example illustrates a method of preparing a substantially cholesterol free liquid egg product.

To 3,264 pounds of liquid egg white at a temperature of from 32° to 45° F. were added 71 pounds of corn oil and 200 pounds of nonfat dry milk solids. These ingredients were thoroughly mixed. A blended mixture of dry ingredients was prepared comprising 6.39 pounds of CMC 7MF, 1.97 pounds of Keltrol F, 0.3 pounds of anhydrous aluminum sulfate, 0.17 pounds of ferric orthophosphate, 0.0044 pounds of thiamine mononitrate, 0.0044 pounds of riboflavin and 28.5 pounds of nonfat dry milk and the mixture added to the previously combined materials with thorough mixing. To this mixture was then added 329 pounds of corn oil at ambient temperature with agitation to produce a base mixture. 75 pounds of corn oil was heated to from 130° to 150° F. with mixing and then 11.7 pounds of lecithin and 10 pounds of Myvatex were added. After mixing for 10 to 15 minutes a small amount of a flavoring agent and a mixture comprising 0.157 pounds of PIGMENTENE Yellow-Gold, 0.11 pounds of a 30 percent dispersion of beta-carotene and 0.0000018 pounds of vitamin $D_2$ in oil was added and thoroughly mixed. This hot mixture was added to the base mixture with blending.

The total ingredient mix was pasteurized by heating at a temperature of about 136° F. for 5 minutes and then was passed through a Manton-Gaulin two stage homogenizer, the first stage being at 1000 p.s.i. and the second stage being at 500 p.s.i. The homogenized product was tested for organoleptic properties and found to be similar to whole eggs.

The terms and expressions which have been employed are used as terms of description and not of limitation. It is not intended, in the use of such terms and expressions, to exclude any equivalents of the features shown and described or portions thereof, since it is recognized that various modifications are possible within the scope of the invention claimed.

What is claimed is:

1. A substantially cholesterol free egg product comprising egg white, nonfat milk solids, vegetable oil and a coloring agent comprising a mixture of beta-carotene and an extract of plant xanthophylls in suitable proportions and amounts to impart substantially the characteristic color of whole eggs to said egg product.

2. A substantially cholesterol free egg product as defined in Claim 1, wherein the amount of beta-carotene present is from about 0.000015 to about 0.0057 percent and the amount of an extract of plant xanthophylls present is from about 0.00005 to about 0.0044 percent, the percentages being based on the weight of the egg product.

3. A substantially cholesterol free egg product as defined in Claim 2, wherein the amount of beta-carotene present is from about 0.0003 to about 0.003 percent and the amount of plant xanthophylls present is from about 0.00020 to about 0.0020 percent.

4. A substantially cholesterol free egg product as defined in Claim 3, wherein the amount of beta-carotene present is from about 0.0004 to about 0.0020 percent and the amount of plant xanthophylls present is from about 0.00026 to about 0.0010 percent.

5. A substantially cholesterol free egg product as defined in Claim 3, wherein the egg product is a liquid egg product.

6. A substantially cholesterol free egg product as defined in Claim 3, wherein the egg product is a cooked egg product.

7. A substantially cholesterol free egg product as defined in Claim 3, wherein the extract of plant xanthophylls is derived from flower petals of plants of the genus *Tagetes*.

8. A substantially cholesterol free egg product as defined in Claim 7, wherein the amount of egg white present is from about 40 to 95 percent and the amount of vegetable oil present is from about 9 to 13 percent, the percentages being based on the weight of the liquid egg composition.

9. A substantially cholesterol free egg product as defined in Claim 8, wherein the vegetable oil is corn oil.

10. A substantially cholesterol free egg product as defined in Claim 8, wherein the amount of nonfat dry milk solids present is from about 3 to about 8 percent, the percentage being based on the weight of the liquid egg composition.

11. A substantially cholesterol free egg product as defined in Claim 10, wherein there is present from about 0.25 to about 0.35 percent lecithin, the percentage being based on the weight of the liquid egg composition.

References Cited

UNITED STATES PATENTS

| | | | |
|---|---|---|---|
| 3,207,609 | 9/1965 | Gorman, et al. | 99—113 |
| 3,594,183 | 7/1971 | Melnick, et al. | 99—114 |
| 3,206,316 | 9/1965 | Kläui | 99—113 |

OTHER REFERENCES

Frutton et al., General Biochemistry, 1953, p. 566, John Wiley & Sons, Inc. New York, N.Y.

A. LOUIS MONACELL, Primary Examiner

R. A. YONCOSKIE, Assistant Examiner

U.S. Cl. X.R.

426—211